United States Patent [19]

Brantley, Jr. et al.

[11] 4,033,676
[45] July 5, 1977

[54] PRESSURE-SHAPED REFLECTOR APPARATUS

[76] Inventors: Lott W. Brantley, Jr., Rte. 2, Box 315A, Union Grove, Ala. 35175; Robert W. Rood, 6510 Greenmeadow Road, Huntsville, Ala. 35810

[22] Filed: Jan. 21, 1976

[21] Appl. No.: 651,008

[52] U.S. Cl. ................................. 350/295
[51] Int. Cl.² .................................. G02B 5/10
[58] Field of Search .......... 350/295, 310; 343/315; 126/270, 271

[56] References Cited
UNITED STATES PATENTS

| | | | |
|---|---|---|---|
| 2,952,189 | 9/1960 | Pajes | 350/295 |
| 3,031,928 | 5/1962 | Kopito | 350/295 |
| 3,056,131 | 9/1962 | McCreary | 350/295 |

*Primary Examiner*—John K. Corbin
*Assistant Examiner*—Jon W. Henry
*Attorney, Agent, or Firm*—L. D. Wofford, Jr.; George J. Porter; John R. Manning

[57] ABSTRACT

A pressure-shaped reflector apparatus is provided for collecting and concentrating electromagnetic radiation waves and the like. The apparatus can be used, among other things, for concentrating solar radiation waves to provide an alternate source of energy. The apparatus includes an upper cylindrical hoop member, a lower cylindrical hoop member and a plurality of vertical strut members carried between the upper and lower hoop members spacing the hoop members apart. A resiliently deformable enclosure is carried between the upper and lower hoop members having an upper reflective surface co-extensive with the upper hoop member. As air is evacuated from the interior surface of the enclosure the upper reflective surface deforms inwardly providing a reflective surface of spherical curvature having high specular reflection properties.

12 Claims, 5 Drawing Figures

PRESSURE-SHAPED REFLECTOR APPARATUS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates to reflectors for collecting and concentrating electromagnetic radiation waves and more particularly to reflectors constructed of film which are deformed into the proper concave shape by placing a pressure differential thereacross. Pressure-shaped film reflectors have been previously developed such as shown in U.S. Pat. No. 3,623,796 and 2,952,189 wherein a film member is stretched across an enclosed space within which a partial vacuum is created to deform the film inwardly providing a curved reflector surface. However, these patents all have a rigid drum or dish-shaped container forming all but the side that the deformable reflective film is on. When used for collecting solar radiation waves for use as an alternate source of energy, large reflective surfaces are necessary such as thirty feet in diameter. The prior structures present structural weight and cost problems when constructed of such a large size and are difficult to fabricate to the required tolerances. There has also been a problem in prior known structures in constructing the reflective film surface to be a truly spherical surface instead of just a concave surface. To construct a truly spherical surface, the film would have to be pre-shaped to a spherical shape and have the same elastic properties about each point in the film.

SUMMARY OF THE INVENTION

A lightweight pressure-shaped reflector apparatus is provided for use in collecting and concentrating electromagnetic radiation waves and the like to provide a resource of energy comprising an upper open cylindrical hoop member, a lower open cylindrical hoop member, and a plurality of strut members carried between the upper and lower hoop members spacing the hoop members apart. A resilient deformable enclosure is carried between the upper and lower hoop members having an interior space. The enclosure has an upper reflective surface co-extensive with the upper hoop member, and means are provided for evacuating air from the interior space of the enclosure creating a partial vacuum therein deforming the upper reflective surface inwardly to form a concave surface providing a highly reflective surface of spherical curvature.

Thus, by utilizing a flexible film to form all the sides of the deformable pressure bag or enclosure, and by utilizing a truss type hoop arrangement composed of rigid rings and struts to maintain the edge condition of the film reflector, a more efficient use of materials is had for large area reflectors.

Accordingly, an important object of the present invention is to provide an efficient and inexpensive apparatus for concentrating electromagnetic radiation to provide an alternate energy resource.

Another important object of the present invention is to provide a lightweight pressure-shaped film reflector which can be constructed as a large area reflector.

Another important object of the present invention is to use a pressure differential across a film to deform the film into a geometrical shape embodying geometrical properties suitable for specular reflection and concentration of radiation waves.

Another important object of the present invention is to provide a pressure-shaped radiation reflector and collector wherein a deformable film is utilized on all side to define an enclosed space within which a partial vacuum is created to deform the film inwardly creating a spherical curvature surface resulting in a lightweight structure.

Another important object of the present invention is to provide a reflector apparatus having a curved reflective surface with a substantially true spherical curvature providing a high specular reflectance to the reflector apparatus.

Yet another important object of the present invention is to provide a solar power concentrator which can be fabricated, adjusted, and operated by untrained personnel such as an average homeowner.

These and other objects and advantages of the invention will become apparent upon reference to the following specification, attendant claims and drawings.

DESCRIPTION OF A PREFERRED EMBODIMENT

The apparatus of the present invention relates to curved reflectors having large surface areas for collecting and concentrating electromagnetic radiation waves such as optical, radio, transmission and power signals and particularly for solar radiation waves. Moreover, since the application of the present invention is substantially the same as with any electromagnetic radiation, utilization with solar radiation is chosen to illustrate the invention in connection with the collection and concentration of the solar radiation to provide an alternate resource of energy.

Figure 1:
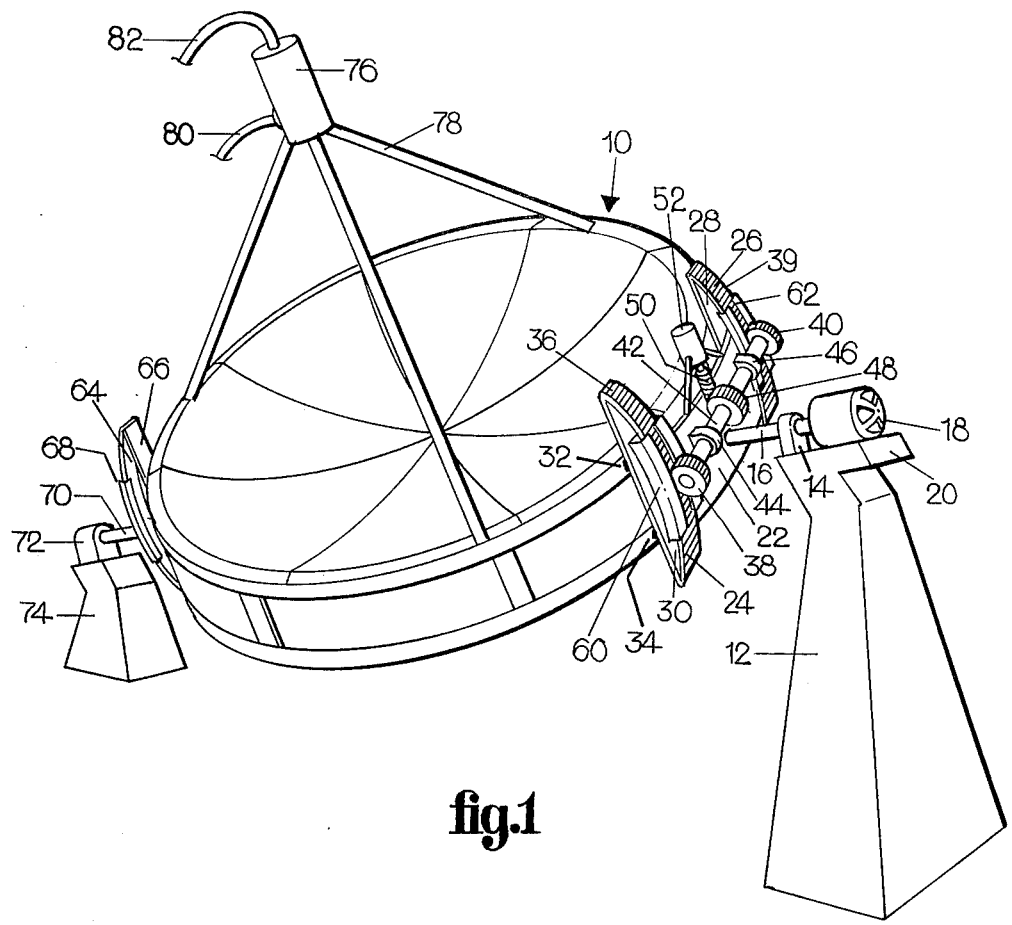
FIG. 1 is a perspective view illustrating a pressure-shaped radiation collector constructed in accordance with the present invention mounted on a solar tracking system.

The pressure-shaped solar reflector apparatus designated generally at 10 is mounted on a tracking system, as shown in FIG. 1, to track the sun during the day as well as making adjustments for seasonal changes in the sun's position. The tracking system includes a standard 12 which is preferably based on the ground. Positioned on top of the standard 12 is a bearing 14 through which a rotatable shaft 16 extends. A diurnal drive motor 18 is suitably supported on an outwardly extending portion 20 of the standard 12. The rotatable shaft 16 is journaled within the diurnal drive motor and operates as the output drive shaft therefrom. The outer end of the shaft 16 is attached to a backing plate 22. When the shaft 16 is rotated the plate 22 is, in turn, rotated for pivoting the reflector apparatus 10 about the shaft axis to compensate for daily changes in the sun's position.

A pair of arcuately shaped rack gears 24 and 26 having a pair of support bars 28 and 30 connected between their respective outer ends are attached to the reflector apparatus 10 as by welding at points 32 and 34. The rack 24 has gear teeth 36 provided thereon which mesh with a pinion gear 38. The rack gear 26 is provided with like gear teeth 39 which mesh with a pinion gear 40. Pinion gears 38 and 40 are carried on the outer ends of a rotatable shaft 42 which is suitably journaled in bearing blocks 44 and 46 which are carried on the plate 22 such as by welding. A gear 48 is carried on a medial portion of the shaft 42 for rotation therewith and meshes with a worm gear 50 which is carried on the output drive shaft of a drive motor 52. Thus, when the drive motor 52 is energized the worm gear 50 rotates the gear 48 to rotate the pinion gears 38 and 40. The pinion gears 38 and 40, in turn, move the rack gears 26 and 24, respectively, to rotate the entire reflector apparatus 10 compensating for seasonal changes in the position of the sun. The rack gears 24 and 26 are slideably carried in a pair of sleeve bearings 60 and 62, respectively, which are attached to the plate 24 such as by welding providing attachment of the reflector apparatus 10 to the backing plate 22 while also providing a smooth drive between the pinion gears and the rack gears.

On the opposite remote end of the reflector apparatus 10 a similar arcuate rack member 64 is provided having a support bar 56 connected between its outer ends which is attached to the reflector apparatus 10 such as by welding. The arcuate rack member 64 has no teeth since it is not driven but slides in a sleeve bearing 68 which is attached to the end of a rotatable shaft 70 having an outer end journaled in a bearing block 72. The bearing block 72 is then carried on top of a standard 74 which is somewhat shorter than the standard 12 in order to place the reflector apparatus at the proper inclination. Thus, as the reflector apparatus is rotated by the tracking system, the opposite end of the reflector apparatus is allowed to rotatably slide in the sleeve member 68 and rotate in the bearing block 72 accordingly. It may not always be necessary to support the reflector apparatus at two ends except when applications are made to very large size reflectors.

Positioned above the reflector apparatus and carried thereon is a suitable solar energy absorber or trap 76 which may be, for example, a solar energy trap as disclosed in NASA patent application Ser. No. 518,544 filed Oct. 29, 1974 now U.S. Pat. No. 3,958,553. The solar energy trap is supported above the reflector apparatus 10 on a tripod 78. the solar energy absorber has an inlet conduit 80 and an outlet conduit 82 through which a fluid may be passed to circulate around the solar energy trap and outward therefrom to remove the thermal energy absorbed therein.

Figure 2:
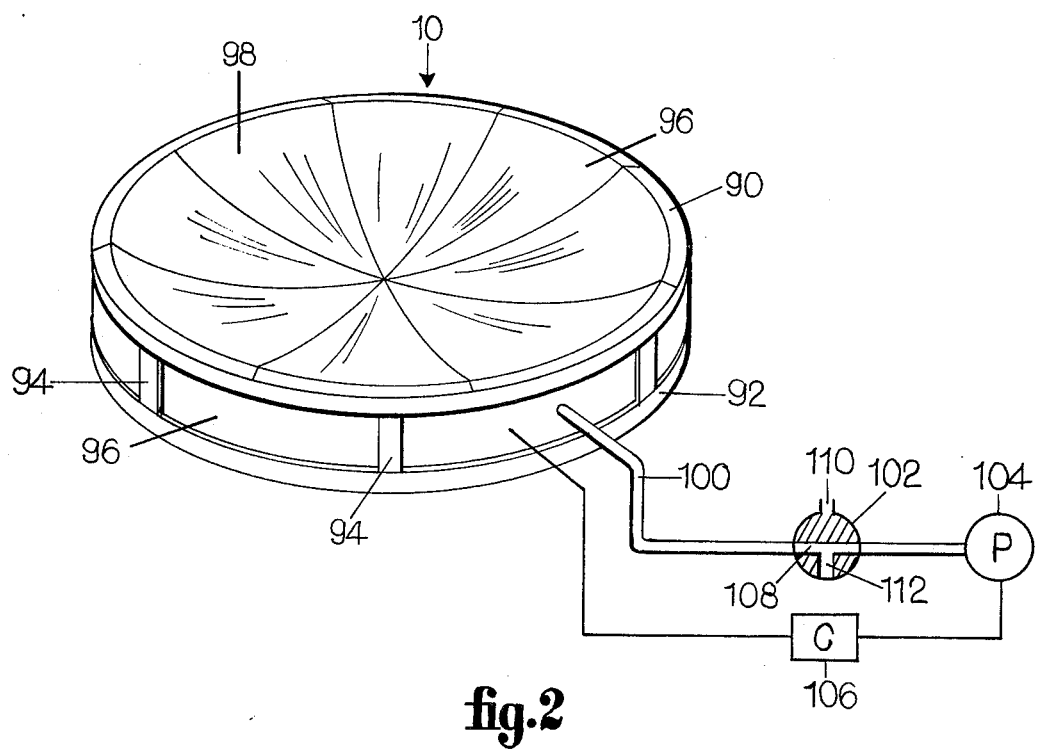
FIG. 2 is a perspective view illustrating a pressure-shaped reflector apparatus for collecting radiation waves having a reflective surface provided by a resilient film deformed inwardly.

Referring now to FIG. 2, a lightweight, pressure-shaped, film reflector apparatus 10 is illustrated for collecting and concentrating electromagnetic radiation waves such as solar energy to provide an alternate source of energy. The reflector apparatus 10 comprises an upper open cylindrical hoop member 90 and a lower, open cylindrical hoop member 92. A plurality of vertical strut members 94 are carried between the upper and lower hoop members 90 and 92 spacing the hoop members apart. Such construction provides a hollow cylindrical frame member having an open top and an open bottom end for carrying a resilient deformable enclosure 96 between the open top and bottom providing an enclosed interior space. The resilient enclosure has an upper reflective surface 98 which is co-extensive with the open top of the upper hoop member 90. Means are provided by way of conduit 100, two-way valve 102 and air pump 104 for evacuating air from the interior space of the enclosure 96 creating a partial vacuum therein to deform the upper reflective surface 98 inwardly providing a highly reflective surface of spherical curvature. In a preferred embodiment, the resilient deformable enclosure 96 is constructed of a polyester film and the upper reflective surface 98 is coated with an aluminized coating providing a highly reflective surface. It is to be understood, however, that other elastomeric deformable materials or films may be used as well as other suitable reflective coatings.

A limit switch (not shown) is provided within the interior space of the enclosure 96 to stop the evacuation of air from the interior space when the reflective surface 98 has reached its desired point of inward deformation and shape. The activation of the limit switch by the deformable surface reaching its limit would send a signal to the control means 106 which would then cut off the air evacuation pump 104. Air is evacuated from the enclosure or bag 96 until the upper surface 98 of the bag is drawn downwardly a predetermined distance so as to produce the desired curvature and consequently the focus of beams contingent thereon. At times, it is often necessary to return air into the bag for maintaining the desired concave configuration of the upper surface 96 due to temperature changes such as between day and night time. In such a case, the limit switch would cause the control means 106 to move the two-way valve 102 such that the valve bore 108 would communicate with an atmospheric port 110 while the valve bore 112 would communicate with conduit 100 so that atmospheric air would be delivered into the interior of the resilient enclosure or bag 96 until the limit switch again senses the desired concave configuration of the bag 96. The valve 102 is preferably a conventional solenoid operated two-way valve and control means 106 a conventional electrical control circuit for energizing the solenoid and the motor of pump 104 in response to the movement of the limit switch. of course, other suitable control type systems could be utilized to ensure that the upper reflective surface 98 maintains its desired configuration of spherical curvature inwardly.

In operation, the upper reflective surface 98 is deformed inwardly to the desired limit which enables an accurate focusing of the reflective beam toward the solar energy absorber 76 mounted above the reflector 10 so as to collect and concentrate the solar energy waves toward the solar energy absorber. The tracking system from which the reflector apparatus 10 is mounted maintains the reflective surface 98 at the proper angle of orientation with respect to the sun so that the maximum solar radiation impinges thereon. The diurnal clock drive motor 18 would serve to rotate the reflector apparatus approximately plus or minus 75° of rotation, and the seasonal drive motor 52 would serve to rotate the reflector apparatus approximately plus or minus 23.5° of rotation. It is to be understood that the reflector apparatus designated generally at 10 may be utilized to collect and concentrate other forms of radiation besides solar energy.

Figure 3:
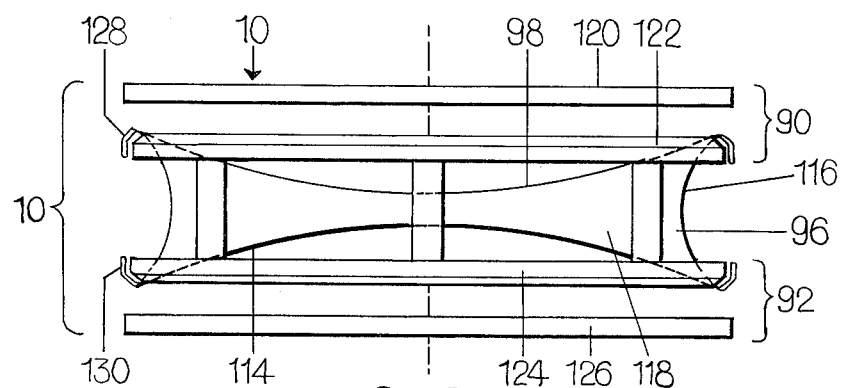
FIG. 3 is a side elevational view of a reflector apparatus constructed in accordance with the present invention illustrating the cylindrical drum frame for holding the deformable film enclosure with parts in a separated configuration.

Referring now to FIG. 3, wherein the reflector apparatus 10 is shown with parts separated for clarity, it can be seen that the resilient deformable enclosure or bag 96 includes a lower surface 114 which is co-extensive with the open bottom end of the lower hoop member 92. The deformable enclosure 96 also includes a side wall surface 116 which connects the upper and lower surfaces 98 and 114 to define the interior space 118 within which a partial vacuum is created to cause all of the surfaces to deform inwardly as shown in FIG. 3.

The upper hoop member 90 includes a pair of cylindrical ring members 120 and 122 with ring member 120 being receivable over ring member 122 in a tightenable manner. Ring member 120 may be in the form of a conventional ring clamp which can have its circumference shortened to tighten about another concentric ring member. Similarly, the lower cylindrical hoop member 92 includes a pair of ring members 124 and 126 with ring member 126 being receivable and tightenable over ring member 124. An upper edge 128 of the upper reflective surface 98 of the deformable bag 96 is stretched over the ring member 122 around the entire periphery of the member and preferably is cemented thereto using any suitable adhesive. The outer ring member 120 is then placed over the ring member 122 with the edge 128 of the bag positioned therebetween, and then the ring member 120 is tightened about the periphery of the ring member 122. Similarly, a lower edge 130 of the lower surface 114 of the deformable bag 96 is cemented to the ring 124 and the lower outer ring 126 is positioned thereover and tightened about the ring 124 to secure the deformable enclosure 96 within the cylindrical drum frame provided thereby.

Figure 4:
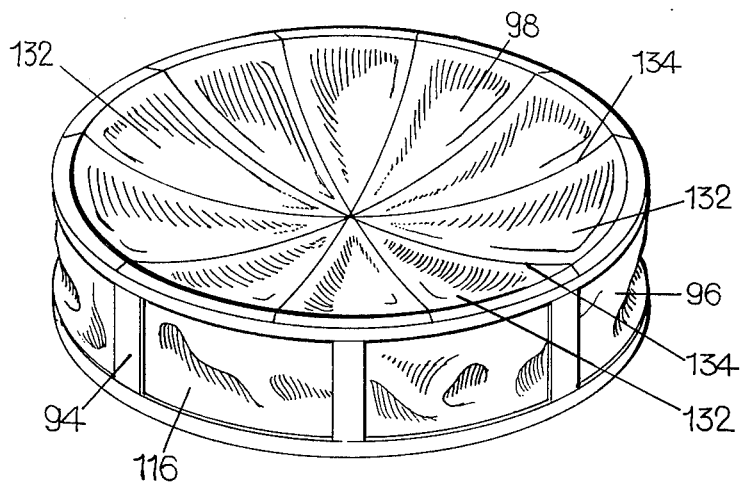
FIG. 4 is a perspective view illustrating a reflector apparatus in accordance with the present invention in an undeformed condition.
Figure 5:
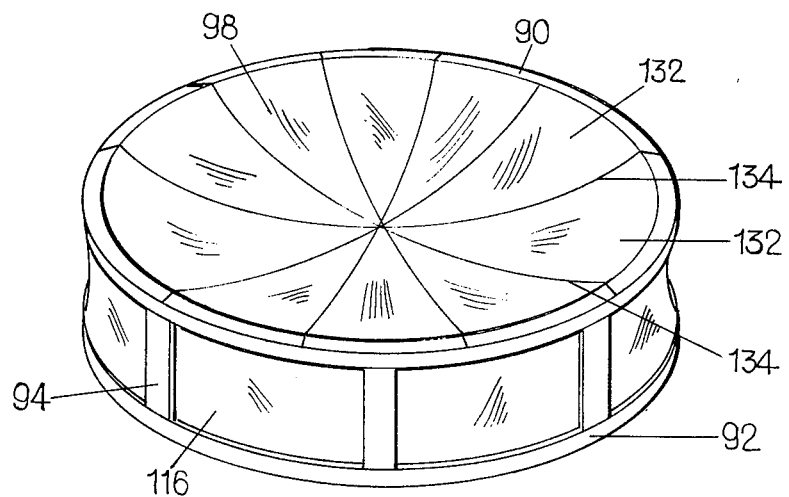
FIG. 5 is a perspective view illustrating the reflector apparatus of the present invention when the reflective surface is in a deformed condition.

In order to ensure that large energy losses do not occur from the reflective surface and in order for the upper reflective surface 98 to have a high specular reflection, the upper reflective surface 98 has an advantageous construction which is substantially truly spherical. The upper reflective surface 98, as best shown in FIGS. 4 and 5, is constructed from a plurality of sectional pieces 132 which are approximately gore-shaped. The sectional pieces 132 extend between seam joints 134 formed at the junctures of the sectional pieces. The sectional pieces 132 can be joined together either by overlapping adges of the sectional pieces and cementing the edges together or by placing the adjacent edges of sectional pieces side-by-side and placing an adhesive strip thereover. The adhesive strip which is placed over the seam joints may also be polyester film having an aluminized reflective coating thereon so that the reflective properties of the upper surface 98 are preserved.

Each of the seam joints 134 extends across the entire upper reflective surface 98 to define a substantially rigid rib of a desired radius of curvature. It is important that the ribs 134 formed at the seams of the sectional pieces are made of double or triple thickness of the mylar film material so that they stretch but not as fast as the sectional pieces extending therebetween. The ribs of the seam joints 134 are pre-constructed to the curvature, whether spherical or parabolic, that it is desired to have the reflective surface 98 assume when the interior of the deformable bag 96 is placed under a partial vacuum. The upper reflective surface 98 and the side surface 116 are shown in FIG. 4 in an undeformed condition. FIG. 5 illustrates the reflector apparatus with the desired amount of vacuum created in the interior space of the enclosure 96. With the correct amount of vacuum created in the interior space of the enclosure of bag 96 so that the proper pressure differential is created on the upper reflective surface 98, the individual sectional pieces 132 will deform inwardly or stretch inwardly to correspond to and have the same radius of curvature as that of the substantially rigid ribs 134 located at the seam joints whereby a concave surface having a desired uniform curvature over the entire surface thereof is produced. Therefore, by judiciously varying the pressure differential across the upper reflective surface, the number of gores or sectional pieces, and the thickness of the polyester film material, the curvature of the upper reflective surface 98 will approximate a sphere, paraboloid or section of ellipsoid to the desired accuracy required for a highly specular reflectance on the upper reflective surface 98.

In a preferred embodiment, a polyester film having a thickness of approximately 3 mils and a modulus of elasticity of 700 to 800, an upper reflective surface constructed of approximately twenty gores or sectional pieces and a pressure differential of about 0.25 psi forms a highly accurate surface of spherical curvature having a high degree of specular reflection.

Thus, it can be seen that a highly efficient and lightweight reflector apparatus is provided so as to have application to large size reflectors. A reflector apparatus can be had with the construction of the present invention whereby a desired accuracy in the curvature of the reflective surface is produced to provide a surface having a high degree of specular reflectance.

While a preferred embodiment of the invention has been described using specific terms, such description is for illustrative purposes only, and it is to be understood that changes and variations may be made without departing from the spirit or scope of the following claims.

What is claimed is:

1. A lightweight pressure-shaped reflector apparatus for use in collecting and concentrating electromagnetic radiation waves and the like to provide a concentrated source of energy comprising:
   a. a hollow cylindrical frame member having an open top and an open bottom end;
   b. a resilient deformable enclosure carried between said open top and bottom having an enclosed interior space;
   c. said enclosure having an upper reflective surface co-extensive with said open top and a lower surface co-extensive with said open bottom end;
   d. means for evacuating air from the interior space of said enclosure creating a partial vacuum therein deforming said upper reflective surface inwardly to form a highly reflective surface of spherical curvature; and
   e. said enclosure including a side wall surface connecting said upper lower surfaces to define said interior space whereby said partial vacuum created therein causes all of said surfaces to deform inwardly.

2. The apparatus set forth in claim 1 wherein said hollow cylindrical frame member includes an upper cylindrical hoop member and a lower cylindrical hoop member having a plurality of non-contacting strut members carried therebetween spacing said hoop members apart.

3. The apparatus set forth in claim 1 wherein said resilient deformable enclosure is constructed of a polyester film.

4. The apparatus set forth in claim 1 wherein said reflective surface includes an aluminized coating carried on said surface.

5. The apparatus set forth in claim 1 wherein said upper reflective surface includes a plurality of sectional pieces extending between seamed joints formed at the junctures of said sectional pieces.

6. The apparatus set forth in claim 5 wherein said seamed joints define a substantially rigid rib of a desired radius of curvature.

7. The apparatus set forth in claim 6 wherein said sectional pieces have greater flexibility than said seamed joints whereby evacuation of a controlled amount of air from said enclosure interior causes said sectional pieces to deform inwardly to assume the curvature of said seamed joints providing a substantially true spherical curvature to said reflective surface.

8. The apparatus set forth in claim 5 wherein said sectional pieces are gore-shaped.

9. The apparatus of claim 6 wherein said seamed joints are formed by over-lapping adjacent edges of respective sectional pieces and cementing said edges together.

10. The apparatus of claim 6 wherein said seam joints are formed by placing adjacent edges of said sectional pieces together and placing an adhesive strip thereover.

11. A lightweight pressure-shaped reflector apparatus for use in collecting and concentrating electromagnetic radiation waves and the like to provide a concentrated source of energy comprising:
   a. an upper open cylindrical hoop member;
   b. a lower open cylindrical hoop member;
   c. a plurality of strut members carried between said upper and lower hoop members spacing said hoop members apart; said strut members being spaced circumferentially about said hoop members and out of contact with adjacent strut members;
   d. a resilient deformable enclosure carried between said upper and lower hoop members having an enclosed space within the interior thereof;
   e. said enclosure having an upper reflective surface co-extersive with said upper hoop member; and
   f. means for evacuating air from said enclosed interior space creating a partial vacuum therein deforming said upper reflective surface inwardly to form a concave surface providing a highly reflective surface of spherical curvature.

12. A lightweight pressure-shaped reflector apparatus for use in collecting and concentrating electromagnetic radiation waves and the like to provide a resource of energy comprising:
   a. a hollow cylindrical frame member having an open top and an open bottom end;
   b. a resilient deformable enclosure carried between said open top and bottom having an enclosed interior space;
   c. said enclosure having an upper reflective surface co-extensive with said open top;
   d. means for evacuating air from the interior space of said enclosure creating a partial vacuum therein deforming said upper reflective surface inwardly to form a highly reflective surface of spherical curvature;
   e. said upper reflective surface including a pluralitu of gore-shaped sectional pieces extending between seamed rib joints formed at the junctures thereof; and
   f. said rib joints being pre-constructed of a desired radius of curvature and having less flexibilty than said sectional pieces so that evacuation of a controlled amount of air from within said enclosure causes said sectional pieces to deform inwardly to conform to the curvature of said rib joints providing a substantially true spherical curvature to said reflective surface.

* * * * *